United States Patent
Schmeichel

(10) Patent No.: US 7,048,277 B1
(45) Date of Patent: May 23, 2006

(54) STRAP BRACKET FOR SOFT ROLL-UP COVERS

(75) Inventor: Charles M. Schmeichel, Jamestown, ND (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

(21) Appl. No.: 11/262,351

(22) Filed: Oct. 28, 2005

Related U.S. Application Data

(63) Continuation of application No. 11/045,696, filed on Jan. 28, 2005, which is a continuation of application No. 10/975,825, filed on Oct. 28, 2004, now abandoned.

(60) Provisional application No. 60/516,077, filed on Oct. 31, 2003.

(51) Int. Cl.
*B60P 7/04* (2006.01)

(52) U.S. Cl. .............................. 276/100.16; 276/100.11

(58) Field of Classification Search ..............................
296/100.16–100.18, 100.11–100.13, 100.01,
296/136.01, 136.03–4, 136.1, 136.12–13
See application file for complete search history.

(56) References Cited

U.S. PATENT DOCUMENTS

| | | | | |
|---|---|---|---|---|
| 2,479,280 | A | * | 8/1949 | Tuerk ..................... 296/100.16 |
| 2,581,985 | A | * | 1/1952 | Tuerk ..................... 296/100.16 |
| 4,547,014 | A | | 10/1985 | Wicker |
| 4,550,945 | A | | 11/1985 | Englehardt |
| 4,563,034 | A | | 1/1986 | Lamb |
| 4,717,196 | A | | 1/1988 | Adams |
| 4,784,427 | A | | 11/1988 | Burgess |
| 4,795,206 | A | | 1/1989 | Adams |
| 4,807,921 | A | | 2/1989 | Champie, III et al. |
| 5,040,843 | A | | 8/1991 | Russell et al. |
| 5,286,086 | A | | 2/1994 | Gunji |
| 5,655,807 | A | | 8/1997 | Rosario |
| 5,775,765 | A | | 7/1998 | Kintz |

(Continued)

OTHER PUBLICATIONS

ACCESS® Roll-up Cover Owner's Manual, © 1996, Agri-Cover, Inc., 8 pages.

(Continued)

*Primary Examiner*—H. Gutman
(74) *Attorney, Agent, or Firm*—Robert C. Freed; Moore, Hansen & Sumner

(57) ABSTRACT

A Strap Assembly for a tonneau cover and a tonneau cover apparatus including a strap assembly. The apparatus preferably includes, a flexible cover, the flexible cover having first and second ends; a support frame for attachment to a cargo box of a pick-up truck; the support frame having a front bar to which the first end of the flexible cover is secured. The strap assembly includes a strap bracket; and a buckle insertion member; a strap to secure the flexible cover in a rolled up configuration proximate the front bar when the flexible cover is not in use to cover an opening defined by the perimeter of the cargo box. The strap has first and second ends; the buckle insertion member being secured to the first end of the strap; and a strap bracket attached to the front bar. The strap bracket includes a buckle insertion receiving member and a strap receiving opening. The buckle insertion receiving member resists movement forward of the front bar of a rolled up segment of the flexible cover, when the rolled up segment is secured to the front bar by the strap when the buckle insertion member is secured to the buckle insertion receiving member and support frame is secured to the cargo box.

12 Claims, 4 Drawing Sheets

U.S. PATENT DOCUMENTS

| | | | |
|---|---|---|---|
| 5,906,407 A | 5/1999 | Schmeichel | |
| 6,003,929 A | 12/1999 | Birdsell | |
| 6,053,556 A | 4/2000 | Webb | |
| 6,543,835 B1 | 4/2003 | Schmeichel et al. | |
| 6,568,740 B1 | 5/2003 | Dimmer | |
| 6,575,520 B1 | 6/2003 | Spencer | |
| 6,607,234 B1 | 8/2003 | Schmeichel | |
| 6,719,353 B1 | 4/2004 | Isler et al. | |
| 6,832,803 B1 * | 12/2004 | Elliott | 296/100.16 |
| 2004/0108746 A1 * | 6/2004 | Elliott | 296/100.16 |
| 2004/0212212 A1 * | 10/2004 | Spencer et al. | 296/100.16 |

OTHER PUBLICATIONS

ACCESS® Roll-up Cover Owner's Manual, © 1999, Agri-Cover, Inc., 7 pages.

ACCESS® Roll-up Cover Owner's Manual, 201 2002, Agri-Cover, Inc., 8 pages.

TRUXEDO 2001® The Classy Cover for your Pickup Box Owner's Manual, Shur-Co., 8 pages, published in 2001.

TRUXEDO® The Classy Cover for your Pickup Box Owner's Manual, Shur-Co., 4 pages, published on or before Jan. 1, 2003.

* cited by examiner

STRAP BRACKET FOR SOFT ROLL-UP COVERS

RELATED APPLICATIONS

The present application is related to and claims priority to U.S. patent application Ser. No. 11/045,696, filed Jan. 28, 2005, entitled STRAP BRACKET FOR SOFT ROLL-UP COVERS which claims priority to U.S. patent application Ser. No. 10/975,825, filed Oct. 28, 2004, entitled STRAP BRACKET FOR SOFT ROLL-UP COVERS, which is related to and claims priority to U.S. Provisional Patent application No. 60/516,077, filed Oct. 31, 2003, entitled STRAP BRACKET FOR SOFT ROLL-UP COVERS, the disclosures of which are incorporated herein by reference.

BACKGROUND OF THE INVENTION

The present invention relates to Strap Assemblies Tonneau Covers, particularly roll-up covers having a flexible cover and an apparatus for attachment of the flexible cover to a cargo box of a pick up truck. The attachment apparatus includes a support frame for securing the flexible cover to the cargo box of a pick-up truck and mechanisms for securing the flexible cover in a rolled-up configuration when the flexible cover is not in use over the top of the cargo box. In preferred embodiments strap assemblies including straps and strap brackets are provided to secure the flexible Tonneau Cover.

DESCRIPTION OF THE PRIOR ART

Numerous protective covers for preventing rain, debris and wind from damaging or disrupting the contents of a pick-up truck bed are currently available. Generally, the covers are made of some sort of fabric, often coated with a polymeric material, which is detachably fastenable to a rigid frame so as to enclose and protect a given area. The covering materials used are generally stretchable to the extent that once they are in a closed position, they are pulled taut and then attached to the frame by numerous methods such as snaps, grommets, or hook-and-loop fasteners and stretcher bars.

The use of hook-and-loop type fasteners and stretcher bars to fasten a cover to a frame structure forms the subject matter of U.S. Pat. Nos. 5,076,338 ('338 patent) and 5,174,353 ('353 patent) issued to Schmeichel et al., the disclosures of which are incorporated herein by reference.

In a subsequent patent, U.S. Pat. No. 6,568,835 (the '835 patent) to Schmeichel et al., the disclosure of which is also incorporated herein by reference, a further Tonneau Cover Apparatus is disclosed including either a spring latch operatively connected with a side rail of the support frame and/or lock members slidingly connected with the end plate or rear bar.

Although the Schmeichel et al. patents teach a number of significant improvements over the prior art, the previously disclosed Tonneau Covers can scratch the paint on the back of the cab of the pick-up truck when the flexible cover is rolled up at the forward end of the cargo box.

The '338 and '353 patents disclose the use of a storage strap to secure the flexible cover to the front bar of the support frame at the forward end just behind the cab of the pick-up truck. When the flexible cover is rolled up and the cargo box is uncovered, a first hook-and-loop fastener attached to a storage strap is detachably fastened to a second hook-and-loop fastener to secure the strap around the rolled-up flexible cover. Unfortunately, when the strap is not snugly secured around the flexible cover or when the flexible cover is not tightly rolled. When it is rolled up the rolled-up cover can slide or fall forward against the back of the cab, occasionally scratching or abrading the paint on the back of the cab. This is a limitation of the prior art which is in need of a solution.

The present invention provides improvements which address this and other limitations associated with the prior art.

SUMMARY OF THE INVENTION

The present invention relates to a tonneau cover apparatus for removable attachment about a top of a perimeter of a cargo box of a pick-up truck, the perimeter of the cargo box including a forward end, two opposing sidewalls and a tailgate, the tailgate being positioned rearward of the forward end. The tonneau cover apparatus includes: a flexible cover, the flexible cover having first and second ends; a support frame for attachment to the cargo box; the support frame having a front bar to which the first end of the flexible cover is secured, the front bar being attachable to the perimeter of the cargo box proximate the forward end when the tonneau cover apparatus is attached to the cargo box; a buckle insertion member; a strap to secure the flexible cover in a rolled up configuration proximate the front bar when the flexible cover is not in use to cover an opening defined by the perimeter of the cargo box; the strap having first and second ends; the buckle insertion member being secured to the first end of the strap. The tonneau cover apparatus further including a strap bracket attached to the front bar; the strap bracket including a buckle insertion receiving member and a strap receiving opening; wherein the second end of the strap is secured to the strap bracket proximate the strap receiving opening and the buckle insertion receiving member is operatively connected with a bracket member of the strap bracket in a manner that restricts the movement of the buckle insertion receiving member such that buckle insertion receiving member resists movement forward of the front bar of a rolled up segment of the flexible cover including the second end of the flexible cover, when the rolled up segment is secured to the front bar by the strap when the buckle insertion member is secured to the buckle insertion receiving member and support frame is secured to the cargo box.

An object of the present invention is to provide an improved system for securing a flexible cover in a rolled up configuration for storage when the flexible cover is not in use to cover an opening defined by the perimeter of the cargo box.

Another object of the present invention is to provide a bracket for securing a strap to a support frame, preferably a front bar.

Another object of the present invention is to maximize and simplify securement of a segment of a flexible cover to a support frame.

Yet another object of the present invention is to reduce wear and tear on the painted surfaces of the pick-up truck from abrasions caused by the flexible cover and other parts of the tonneau cover apparatus when the flexible cover is rolled up and when it is stored in a rolled up configuration.

Still another object of the present invention is to lessen the exposure of painted surfaces of the cab of the pick-up truck to abrasion.

Another object of the present invention is to minimize rotation of the buckle insertion receiving member with respect to a receiving end of a bracket structure of the strap bracket so as to restrict movement of the flexible cover forward of the front bar or toward the cab, when the cover is in a rolled up configuration secured to the front bar proximate the forward end of the cargo box.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

DETAILED DESCRIPTION OF THE PREFERRED EMBODIMENT

Figure 1:
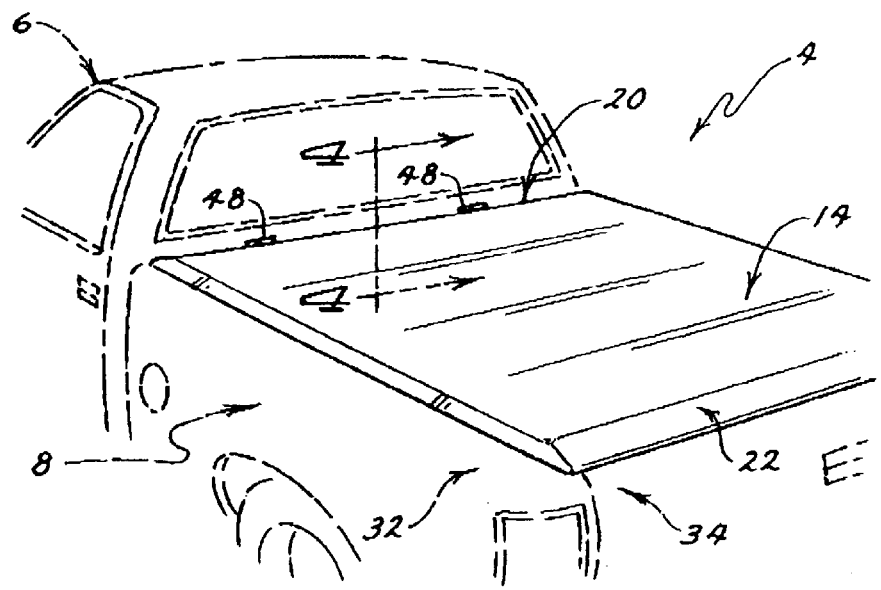
FIG. 1 is a partial perspective view of a tonneau cover apparatus of the present invention when attached to the perimeter of a cargo box of a pick-up truck (shown in phantom)

Referring now to FIG. 1, the tonneau cover apparatus 4 is partially shown on a pick-up truck 6. The tonneau cover apparatus 4 is a soft roll-up cover of the type having a flexible cover 14, which is secured to a cargo box 8 of the pick-up truck 6 by a support frame 10 (see FIGS. 2–5).

Referring now also to FIGS. 2–5, the tonneau cover apparatus of the present invention will have the same general features of the tonneau cover apparatus disclosed in U.S. Pat. Nos. 5,076,338; 5,174,353 and 6,568,835 which will generally include a pair of opposite side rails 16 (shown in part in phantom in FIG. 2) a front bar 18 and a rear bar (not shown). The flexible cover 14 has a first end 20 secured to the front bar 18 and a second end 22 which will be connected to the rear bar (not shown) in the manner described in the '835 patent.

The present tonneau cover apparatus 4 includes the flexible cover 14, a support frame 10 for attachment to the cargo box 8. The support frame 10 includes two opposing side rails 16 and a front bar 18 to which the first end 20 of the flexible cover 14 is secured. The front bar 18 is secured to the support frame 10 proximate a forward end 30 of the cargo box 8. The cargo box 8 includes the forward end 30 two opposing side walls 32 and a tailgate 34 shown in phantom. The tonneau cover apparatus further includes a buckle insertion member 40, a strap 42 to secure the flexible cover 14 in a roll-up configuration of the type shown in FIG. 2; and a strap bracket 46 attached to the front bar 18. The strap bracket 46 includes a first buckle insertion receiving member 48. The strap 42 has two ends, the first end 52 being secured to the buckle insertion member 40 and the second end 54 being secured to a strap receiving opening 56 in the strap bracket 46.

In preferred embodiments, the buckle insertion member 40 and the buckle insertion receiving member 48, together, make up a buckle 60. In preferred embodiments the buckle 60 is a side release buckle. It will be appreciated that the buckle 60 shown in the drawings is a specific side release buckle, but that any buckle will suffice and fall within the spirit and the scope of the present invention. For instance, it will be appreciated that there are a large number of different side release buckles having different configurations and different release mechanisms. Furthermore, there are other buckles, multi-release buckles, center-release buckles, buffer-release buckles and the like. It will be appreciated that any buckle, so long as it has an insertion end and a receiving end functioning in the same general manner as the present buckle insertion member 40 and the present buckle insertion receiving member 48 function to secure the strap.

Figure 3:
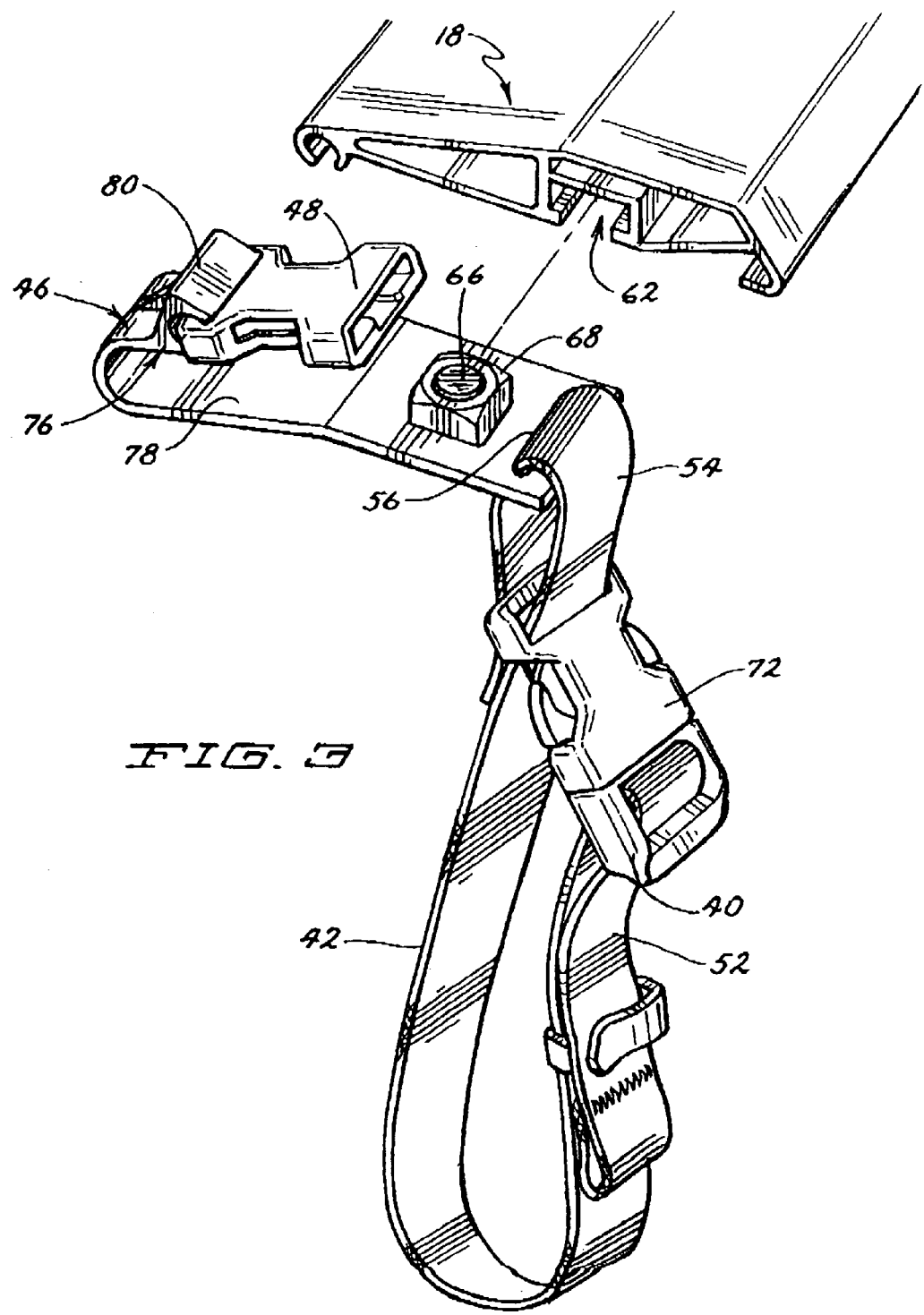
FIG. 3 is an enlarged exploded view of a strap bracket of the present invention, similar to that shown in FIG. 2, separated from the front bar of the tonneau cover apparatus.
Figure 4:
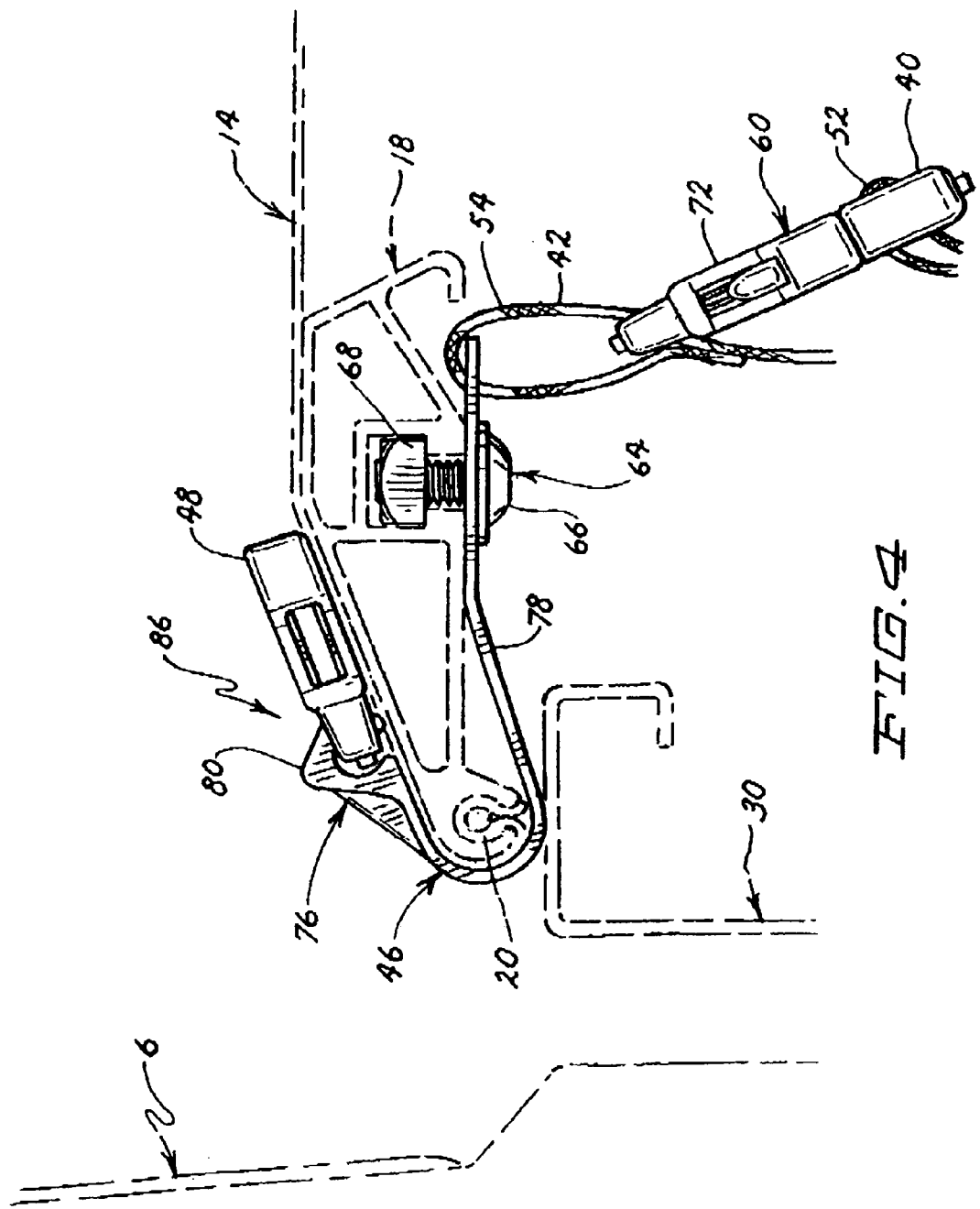
FIG. 4 is a side view of the strap bracket of the present invention as seen from the line 4—4 of FIG. 1, showing a partial cross-section of portions of the pick-up truck and the tonneau cover apparatus, specifically the front bar, in phantom.
Figure 5:
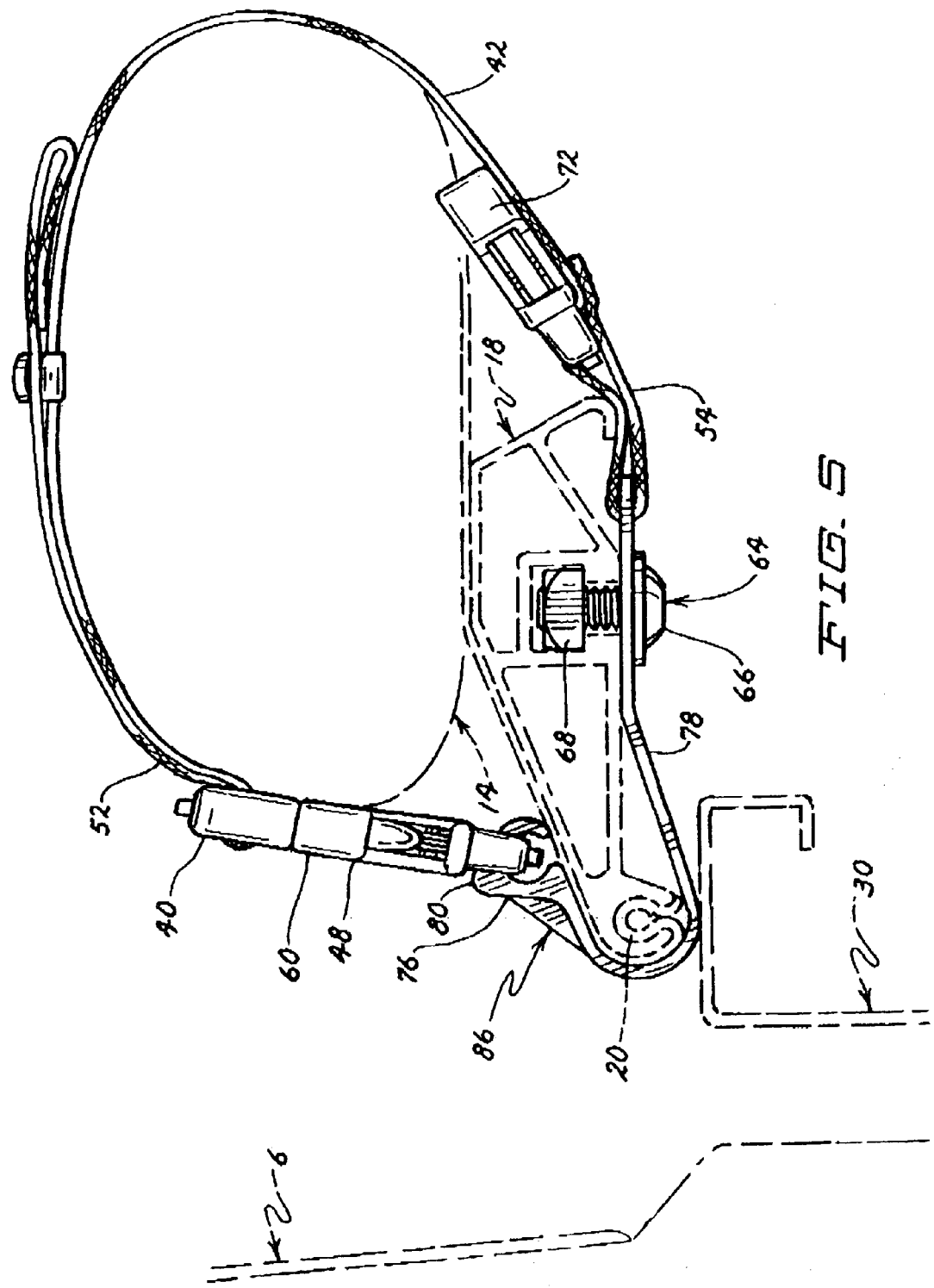
FIG. 5 is a side view as seen from the line 5—5 of FIG. 2 showing the strap bracket and partial sectional views of parts of the pick-up truck and the tonneau cover apparatus, specifically the front bar and the flexible cover, in phantom.

As shown in FIGS. 3–5, the strap bracket 46 includes a buckle insertion receiving member 48 and a strap receiving opening 56. The strap 42 is secured within a channel 62 of the underside of the front bar 18 by a threaded bolt assembly 64. It will be appreciated that other coupling devices that are noted in the art may also be used to secure the strap bracket to the front bar 18 and still fall within the spirit and the scope of the present invention. The present threaded bolt assembly 64, however, is preferred because it includes a bolt 66 that is reciprocally threaded with respect a nut 68 that can slide within the channel 62 unless the bolt 66 is tightened to draw the nut 68 against the bottom edges of the channel 62 creating sufficient friction to secure the strap bracket 46 in place with respect to the front bar 18. The bolt 66 passes thru a bolt receiving opening (not shown) in a bracket member 78 of the strap bracket 46.

Figure 2:
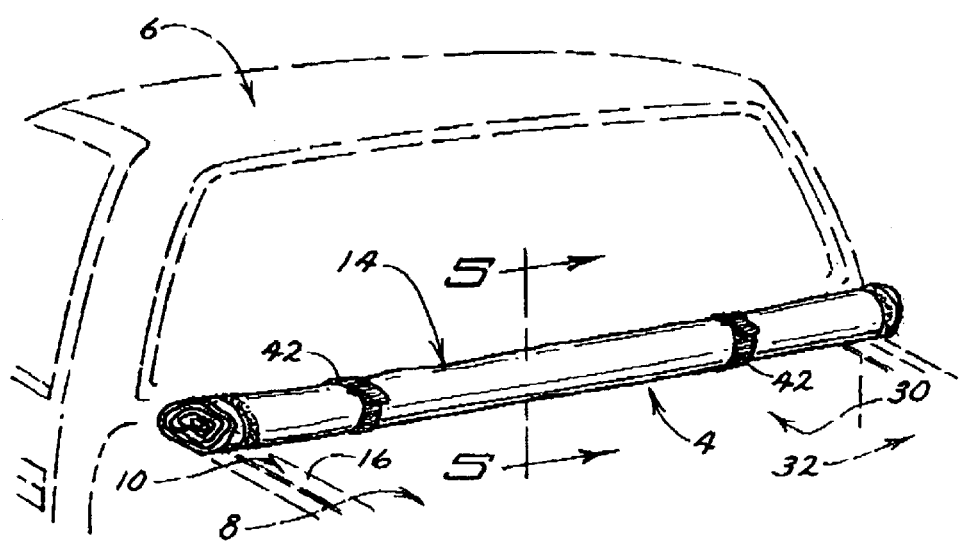
FIG. 2 is an enlarged perspective view, similar to that shown in FIG. 1, but showing a flexible cover of the tonneau cover apparatus, shown in FIG. 1, rolled up and secured to a front bar (not shown) at a forward end of the cargo box.

In the preferred embodiment, a second buckle insertion receiving member 72 is secured to the second end 54 of the strap 42. The second end 54 provides a secure location for receiving the buckle insertion member 40 when the strap 42 is not in use to secure the flexible cover 14 when it is in a rolled up configuration proximate the front bar 18, as shown in FIG. 2. In use, the strap bracket 46 is used to secure the strap 42 so that the buckle insertion member 40 can be inserted into the buckle insertion receiving member 48 after the strap encircles the flexible cover 14, when the flexible cover 14 is in its rolled up configuration, as a continuation of the strap bracket 46 and its buckle insertion receiving member 48. When the strap 42 is not in use to secure the flexible cover 14 in its rolled up configuration, the buckle insertion member 40 can be secured within the second buckle insertion receiving member 72. In this way, the strap 42, which hangs down below the strap bracket 46 when the strap 42 is not in use, will be shortened so that the buckle insertion member 40 is not hanging loosely within the cargo box 8 in such a way so as to be subject to breakage in the cargo box 8.

A shown in FIG. 5, the buckle insertion receiving member 48 is secured to a receiving end 76 of a bracket member 78 to combine to form the strap bracket 46. The receiving end 76 of the bracket member 78 includes a raised ridge 80 that prevents the buckle insertion receiving member 48 from sliding all the way around the receiving end 76, such that the buckle insertion receiving member 48 cannot rotate past an upright position, similar to that shown in FIG. 5, when the bracket member is generally horizontally oriented as shown in FIG. 5. It will be appreciated that the buckles used with the present invention are commonly known buckles purchased from a variety of vendors of this type of connectors. The strap 42 is preferably a nylon strap, but it will be appreciated that other kinds of straps suitable for this use will also fall within the spirit and the scope of the present invention. Such straps may include a variety of elastomeric straps that stretch, whether the straps are elastomeric in part or entirely elastomeric. The bracket member 78 is preferably a molded piece made of a hard plastic, such as a hard nylon material and the like, preferably a glass filled nylon resin material. It will be appreciated that the bracket member 78 may also be made of a metal form material, but a hard plastic is preferred.

A strap assembly 86 for attachment to an extruded bar 18 having a channel 62 is provided. A threaded bolt assembly 64 is preferably used to secure the strap assembly 86 to the extruded bar 18. The strap assembly 86 includes a strap 42 having first and second ends 52, 54, respectively; a buckle insertion member 40; the buckle insertion member 40 being secured to the first end 52 of the strap 42;

a buckle insertion receiving member 48; and a bracket member 78. The bracket member 78 includes a buckle receiving end 76 for attachment of the buckle insertion receiving member 48 and a strap receiving opening 56, wherein the second end 54 of the strap 42 is secured to the bracket member 78 proximate the strap receiving opening 56 and the buckle insertion receiving member 48 is operatively connected with a bracket member 78 of the strap assembly 86 in a manner that restricts the movement of the buckle insertion receiving member 48 such that the buckle insertion receiving member is prevented from completing an unlimited rotation of the buckle insertion receiving member 48 with respect to the bracket member 78; the buckle receiving end 76 including a raised ridge 80 that restricts rotation of the buckle insertion receiving member 48 about the buckle receiving end 76.

In an alternate embodiment of the present tonneau cover apparatus 4 the apparatus includes: a flexible cover 14, the flexible cover 14 having first and second ends 20, 22; a support frame 16 for attachment to the cargo box 8; the support frame 16 having a front bar 18 to which the first end 20 of the flexible cover 14 is secured, the front bar 18 having a channel 62 extending for at least a portion of a length of front bar 18, the front bar 18 being attachable to the perimeter of the cargo box 8 proximate the forward end 18 when the tonneau cover apparatus 4 is attached to the cargo box 8 such that the channel 62 is accessible from an underside of the front bar 18 when the support frame 16 is attached to the cargo box 8; a strap 42 to secure the flexible cover 14 in a rolled up configuration proximate the front bar 18 when the flexible cover 14 is not in use to cover an opening defined by the perimeter of the cargo box 8; the strap 42 having first and second ends 52, 54; the first end 52 of the strap being available to secure the flexible cover 14 to the front bar 18 when the flexible cover 14 is in the rolled up configuration proximate the front bar 18; the second end 54 being secured to the front bar 18 by a coupling device, preferably a bolt assembly 64, at least partially secured within the channel 62. It will be appreciated that the bolt assembly 64 may be replaced by any coupling device that is known in the art and that any coupling device that serves the purpose of securing the strap 42 to the underside of the front bar 18 utilizing the channel 62 of the front bar 18 will fall within the spirit and the scope of the present invention.

A method of securing a flexible cover 14 of a tonneau cover apparatus 4 in a rolled up configuration proximate a forward end 30 of a cargo box 8 of a pick-up truck 6 is also provided. The method includes the steps of: providing a tonneau cover apparatus 4, which is removably attachable about a top of a perimeter of the cargo box 8, the perimeter of the cargo box 8 including a forward end 30, two opposing sidewalls 32 and a tailgate 34, the tailgate 34 being positioned rearward of the forward end 30. The tonneau cover apparatus 4 includes: a flexible cover 14 having first and second ends 20, 22; a support frame 16 for attachment to the cargo box 8; the support frame 16 having a front bar 18 to which the first end 20 of the flexible cover 14 is secured, the front bar 18 being attachable to the perimeter of the cargo box 8 proximate the forward end 30 when the tonneau cover apparatus 4 is attached to the cargo box 8; a buckle insertion member 40; a strap 42 to secure the flexible cover 14 in a rolled up configuration proximate the front bar 18 when the flexible cover 14 is not in use to cover an opening defined by the perimeter of the cargo box 8; the strap 42 having first and second ends 52, 54; the buckle insertion member 40 being secured to the first end 52 of the strap 42; and a strap bracket 46 attached to the front bar 18; the strap bracket 46 including a buckle insertion receiving member 48 and a bracket member 78, the bracket member 78 having a strap receiving opening 56 and a receiving end 76, wherein the second end 54 of the strap 42 is secured to the strap bracket 46 proximate the strap receiving opening 56 and the buckle insertion receiving member 48 is operatively connected with the receiving end 76 of the bracket member 78 in a manner that restricts the movement of the buckle insertion receiving member 48 such that buckle insertion receiving member 48 resists movement of a rolled up segment of the flexible cover 14 forward of the front bar 18 when: the rolled up segment is secured to the front bar 18 by the strap 42, the buckle insertion member 40 is secured to the buckle insertion receiving member 48 and the support frame 16 is secured to the cargo box 8.

The method further includes securing a segment of the flexible cover 14 to the front bar 18 when the segment of the flexible cover 14 is in a rolled up configuration proximate the front bar 18 by wrapping the strap 42 at least partially around the flexible cover 14 and the front bar 18 and inserting the buckle insertion member 40 into the buckle insertion receiving member 48 to secure the strap 42 to the buckle insertion receiving member 48.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tonneau cover apparatus for removable attachment about a top of a perimeter of a cargo box of a pick-up truck, the perimeter of the cargo box including a forward end, two opposing sidewalls and a tailgate, the tailgate being positioned rearward of the forward end, the tonneau cover apparatus comprising:

a flexible cover, the flexible cover having first and second ends;

a support frame for attachment to the cargo box; the support frame having a front bar to which the first end of the flexible cover is secured, the front bar being attachable to the perimeter of the cargo box proximate the forward end when the tonneau cover apparatus is attached to the cargo box;

a buckle insertion member;

a strap to secure the flexible cover in a rolled up configuration proximate the front bar when the flexible cover is not in use to cover an opening defined by the perimeter of the cargo box; the strap having first and second ends; the buckle insertion member being secured to the first end of the strap; and a strap bracket attached to the front bar; the strap bracket including a buckle insertion receiving member and a strap receiving member, wherein the second end of the strap is secured to the strap bracket proximate the strap receiving member; wherein the strap bracket is secured to a bottom side of the front bar.

2. The tonneau cover apparatus according to claim 1, wherein the buckle insertion receiving member is operatively connected with a bracket member of the strap bracket in a manner that restricts the movement of the buckle insertion receiving member such that the buckle insertion receiving member resists movement of a rolled up segment of the flexible cover forward of the front bar, when the rolled up segment is secured to the front bar by the strap and when the buckle insertion member is secured to the buckle insertion receiving member and the support frame is secured to the cargo box.

3. The tonneau cover apparatus according to claim 2, wherein bracket member has a buckle receiving end for attachment of the buckle insertion receiving member; the buckle receiving end including a raised ridge that restricts rotation of the buckle insertion receiving member about the buckle receiving end.

4. The tonneau cover apparatus according to claim 1, wherein the strap bracket is secured to a bottom side of the front bar using a bolt that is threadably secured to a reciprocally threaded nut within a channel in the front bar.

5. The tonneau cover apparatus according to claim 1 further comprising a second buckle insertion receiving member secured proximate to the second end of the strap.

6. A tonneau cover apparatus for removable attachment about a top of a perimeter of a cargo box of a pick-up truck, the perimeter of the cargo box including a forward end, two opposing sidewalls and a tailgate, the tailgate being positioned rearward of the forward end, the perimeter of the cargo box defining an opening when the tailgate is in a closed position, the tonneau cover apparatus comprising:

a flexible cover, the flexible cover having first and second ends;

a support frame for attachment to the cargo box; the support frame having a front bar to which the first end of the flexible cover is secured, the front bar having an underside and a channel extending along the underside for at least a portion of the length of the front bar, the front bar being attachable to the perimeter of the cargo box proximate the forward end when the tonneau cover apparatus is attached to the cargo box such that the flexible cover can cover the opening;

a strap assembly secured to the front bar, the strap assembly including a strap bracket and a strap to secure the flexible cover in a rolled up configuration proximate the front bar when the flexible cover is not in use to cover the opening defined by the perimeter of the cargo box; the strap having first and second ends; the first end of the strap being available to secure the flexible cover to the front bar when the cover is in the rolled up configuration proximate the front bar; the second end being secured to the strap bracket and the strap bracket being secured within the channel.

7. The tonneau cover apparatus according to claim 6, wherein the strap assembly further includes a buckle insertion member and a buckle insertion receiving member, the strap bracket including a bracket member having a buckle receiving end for attachment of the buckle insertion receiving member and a strap receiving end including a strap receiving member; the buckle receiving end including a raised ridge that restricts rotation of the buckle insertion receiving member about the buckle receiving end when the buckle insertion receiving member is secured thereto.

8. The tonneau cover apparatus according to claim 7, wherein the strap receiving member includes a strap receiving opening, the strap being secured within the strap receiving opening.

9. The tonneau cover apparatus according to claim 6, wherein the strap bracket is secured to a bottom side of the front bar using a bolt that is threadably secured to a reciprocally threaded nut within the channel in the front bar.

10. The tonneau cover apparatus according to claim 8, further comprising a second buckle insertion receiving member secured proximate to the second end of the strap.

11. A method of securing a flexible cover of a tonneau cover apparatus in a rolled up configuration proximate a forward end of a cargo box of a pick-up truck, the method comprising the steps of:

providing a tonneau cover apparatus, the tonneau cover apparatus including:

a flexible cover, the flexible cover having first and second ends;

a support frame for attachment to the cargo box; the support frame including a front bar having an underside to which the first end of the flexible cover is secured, the front bar being attachable to the cargo box proximate the forward end when the tonneau cover apparatus is attached to the cargo box; and a strap assembly; the strap assembly including a buckle insertion member; a strap bracket and a strap to secure the flexible cover in the rolled up configuration proximate the front bar when the flexible cover is not in use to cover an opening defined by the perimeter of the cargo box; the strap having first and second ends; the buckle insertion member being secured to the first end of the strap; the strap bracket being attached to the underside of the front bar; the strap bracket including a buckle insertion receiving member and a bracket member, the bracket member having a strap receiving member and a receiving end, wherein a second end of the strap is secured to the strap bracket proximate the strap receiving member; and securing the rolled up segment of the flexible cover to the front bar when the rolled up segment of the flexible cover is in a rolled up configuration proximate the front bar by wrapping the strap at least partially around the flexible cover and inserting the buckle insertion member into the buckle insertion receiving member to secure the strap to the buckle insertion receiving member.

12. The method of claim 11, wherein the buckle insertion receiving member is operatively connected with the receiving end of the bracket member in a manner that restricts the movement of the buckle insertion receiving member such that the buckle insertion receiving member resists movement forward of the front bar of a rolled up segment of the flexible cover when: (a) the rolled up segment is secured to the front bar by the strap; (b) the buckle insertion member is secured to the buckle insertion receiving member and (c) the support frame is secured to the cargo box, the step of securing further including securing the rolled up segment of the flexible cover so that the buckle insertion receiving member restricts movement of the rolled up segment of the flexible cover.

* * * * *